US012781559B2

(12) United States Patent
Delneufcourt et al.

(10) Patent No.: US 12,781,559 B2
(45) Date of Patent: Nov. 3, 2026

(54) VEHICLE WINDOW COMPRISING A WINDOW HOLDER

(71) Applicant: AGC GLASS EUROPE, Louvain-la-neuve (BE)

(72) Inventors: Sébastien Delneufcourt, Gosselies (BE); Robert Hick, Chenee (BE); Maria Vega, Gosselies (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 0 days.

(21) Appl. No.: 18/005,744

(22) PCT Filed: Aug. 5, 2021

(86) PCT No.: PCT/EP2021/071865
§ 371 (c)(1),
(2) Date: Jan. 17, 2023

(87) PCT Pub. No.: WO2022/029225
PCT Pub. Date: Feb. 10, 2022

(65) Prior Publication Data
US 2023/0304348 A1 Sep. 28, 2023

(30) Foreign Application Priority Data
Aug. 7, 2020 (EP) .................................... 20189992

(51) Int. Cl.
*E05F 11/38* (2006.01)
*B60J 1/00* (2006.01)

(52) U.S. Cl.
CPC ............ *E05F 11/385* (2013.01); *B60J 1/006* (2013.01); *E05Y 2600/526* (2013.01);
(Continued)

(58) Field of Classification Search
CPC ................................ E05F 11/385; B60J 1/006
(Continued)

(56) References Cited

U.S. PATENT DOCUMENTS

| | | | | |
|---|---|---|---|---|
| 4,944,984 A * | 7/1990 | Kunert | B60J 10/34 | 296/84.1 |
| 7,047,576 B2 * | 5/2006 | Tavivian | A47K 3/30 | 4/596 |

(Continued)

FOREIGN PATENT DOCUMENTS

| | | |
|---|---|---|
| DE | 36 24 118 A1 | 1/1988 |
| JP | 57-205680 | 12/1982 |
| WO | WO 2019/115078 A1 | 6/2019 |

OTHER PUBLICATIONS

International Search Report issued on Oct. 21, 2021 in PCT/EP2021/071865 filed on Aug. 5, 2021, 2 pages.

*Primary Examiner* — Marcus Menezes
(74) *Attorney, Agent, or Firm* — Oblon, McClelland, Maier & Neustadt, L.L.P.

(57) ABSTRACT

A vehicle window including a panel having a first surface and a second surface and at least a window holder for firmly retaining the panel to a lifting system including an inner member having a bonding part to be bonded to a first surface of the panel, an outer member having a fixing part to be fixed to the lifting system and an assembling device. The bonding part of the inner member is bonded with a bonding material to the first surface and the outer member is assembled to the inner member via the assembling device to clutch the panel.

11 Claims, 3 Drawing Sheets

(52) U.S. Cl.
CPC ... *E05Y 2800/676* (2013.01); *E05Y 2800/678* (2013.01); *E05Y 2800/683* (2024.05)

(58) Field of Classification Search
USPC .................................................... 49/348–352
See application file for complete search history.

(56) References Cited

U.S. PATENT DOCUMENTS

| | | | | |
|---|---|---|---|---|
| 8,096,080 | B2 * | 1/2012 | Pavlovic ............... | E05F 11/488 49/374 |
| 8,904,711 | B2 * | 12/2014 | Lopez ...................... | B60J 1/007 49/374 |
| 8,943,750 | B2 * | 2/2015 | Twork, Jr. ............. | E05F 11/385 49/352 |
| 9,032,669 | B1 * | 5/2015 | Phillips ...................... | B60J 1/17 49/502 |
| 11,952,819 | B2 * | 4/2024 | Kleyer ....................... | B60J 1/17 |
| 2003/0093960 | A1 * | 5/2003 | Mizusawa ............. | E05F 11/385 49/375 |
| 2004/0111970 | A1 * | 6/2004 | Fenelon ................ | E05F 11/525 49/349 |
| 2004/0139662 | A1 | 7/2004 | Mizusawa et al. | |
| 2004/0221950 | A1 | 11/2004 | Mizusawa et al. | |
| 2018/0222291 | A1 * | 8/2018 | Morita .................... | C03C 17/28 |
| 2021/0079708 | A1 | 3/2021 | Kleyer et al. | |

* cited by examiner

VEHICLE WINDOW COMPRISING A WINDOW HOLDER

TECHNICAL FIELD

The present invention relates to a vehicle window comprising a window holder and method to manufacture such vehicle window.

BACKGROUND ART

In a vehicle, some windows are movable especially side windows also called sidelites. The movement is given by a lifting device. The position of the window in its closed position is important to avoid sealing issues and whistling noises.

A way to decrease the consumption of vehicles is to improve the aerodynamic of the vehicle. For this purpose, some side windows can be made with flush designs. In order to ensure the flushness, doors are designed without guiding frame and windows in their closed position seem to be in continuity with the car body. This needs a correct positioning of the window between the lifter system, the opened position and the closed position.

To avoid these problems and to fulfil the requirements of OEM's, movable windows mounted in the vehicle have to be positioned correctly in the vehicle. These problems can be even more critical when the windows are not guided during lifting and lowering in an guiding structure. In a convertible vehicle, windows are not guided but they have to be in their correct position in space to be coupled with the sliding roof.

Requirements of vehicle makers give a shape, dimensions and tolerances for the window itself but also the position of the window in the space when this window is mounted in a vehicle and is lifted at his closing position. This position is defined by points in the space and depends of the design of the vehicle body and the position of the sliding roof.

Due to tolerances of the shape and dimensions of the window, tolerances of fixation in the holder and other tolerances accepted by the vehicle maker, it's difficult to position the window in the correct position after that the window is attached on the holder and without tuning this position on the lifting device when the window is mounted on the car body via the lifting device.

Heretofore, a holder is attached to a vehicle window and at the same time is attached to a lifting device for lifting and lowering the vehicle window. These known holders are rigid and the window is attached on the holder. The attachment on the holder can be done by clipping or screwing. Due to that attachment and due to tolerances of different components, once the window is fixed in the holder and mounted on the vehicle, it's difficult to reproduce the correct position of the window.

To adapt the position of the window before fixing, the window can be forced into the holder with a certain angle and maintained in with this angle during the fixation step. A lot of manipulations and settings are compulsory to fix the window in the holder in a this position. And once the window is fixed it is not possible to change the angle formed between the holder and the glazing to compensate remaining tolerances.

Known holder for example consists in U-shape made in Aluminium or plastic which is bonded to the glass bottom edge. Depending on the design of the component the holder could bring some rigidity to the glass and could be adjusted in order to give repeatable orientation. This kind of solution is difficult to get in production due to the bonding constrains to the glass sheet.

Another way consists in applying directly the holder to the glass surface. In this case, orientation of the holder is depending of the glass tolerances. In case of frameless doors a system need to adjust the glass orientation into the doors in order to get the right compression on the sealing component and avoid to get ingress of air; dust or water. Each sidelight needs to get a different adjustment into the car assembly which could create some adjustment issue on the OEM assembly line.

The invention provides a solution to overcome the above described issues.

SUMMARY OF INVENTION

It is an object of the present invention to alleviate these problems, and to provide a vehicle window able to give the right geometry of the system in to the car body without adjustment needed on the car body. The holder could be set-up on the glass independently of the tolerance of the naked glass. The glue used is compensating and could accommodate to glass geometry. The fast curing glue also allows to keep a correct positioning of the holder after assembly process avoiding using tapes for example.

A second advantage is the increase in term of rigidity. The invention increase the stiffness of the system without increasing the stress level into the glass. By using this invention, side window keep pressure on the car body sealers in order to avoid ingress of air, dust or water.

According to a first aspect of the invention, the invention relates to an improved vehicle window comprising

- a panel having a first surface and a second surface and
- at least a window holder for firmly retaining the panel to
  - a lifting system comprising
  - an inner member having a bonding part to be bonded to a first surface of the panel
  - an outer member having a fixing part to be fixed to the lifting system
- an assembling means.

The invention relates also to a method to manufacture a vehicle window according to a first aspect of the invention.

The solution as defined in the first aspect of the present invention is based on where the bonding part of the inner member is bonded with a bonding material to said first surface and in that the outer member is assembled to the inner member via the assembling means to clutch the panel.

In one embodiment, the panel comprises more than one hole to fix different elements or to fix with more than one fixing point an element.

The plastic material can be any material able to maintain the fixing mean.

In a preferred embodiment, the plastic material is a rigid material and more preferably a polybutylene based material. Other hard materials, with a young modulus higher than 1000 MPa, as polypropylene, polyamide, styrenic and others can be also used.

In another embodiment, the plastic material can be a soft material preferably a thermoplastic elastomer based material. Styrenic based and vulcanized thermoplastics elastomer can also be used. The soft material is in another embodiment a soft polyvinyl chloride or a poly-urethane based material.

In case of a poly-urethane based material, a gluing of the fixing mean is preferred.

It is noted that the invention relates to all possible combinations of features recited in the claims.

The following description relates to an automotive window unit but it's understood that the invention may be applicable to others fields like architectural windows which have to be attached.

BRIEF DESCRIPTION OF DRAWINGS

This and other aspects of the present invention will now be described in more detail, with reference to the appended drawings showing various exemplifying embodiments of the invention which are provided by way of illustration and not of limitation. The drawings are a schematic representation and not true to scale. The drawings do not restrict the invention in any way. More advantages will be explained with examples.

DESCRIPTION OF EMBODIMENTS

Figure 1:
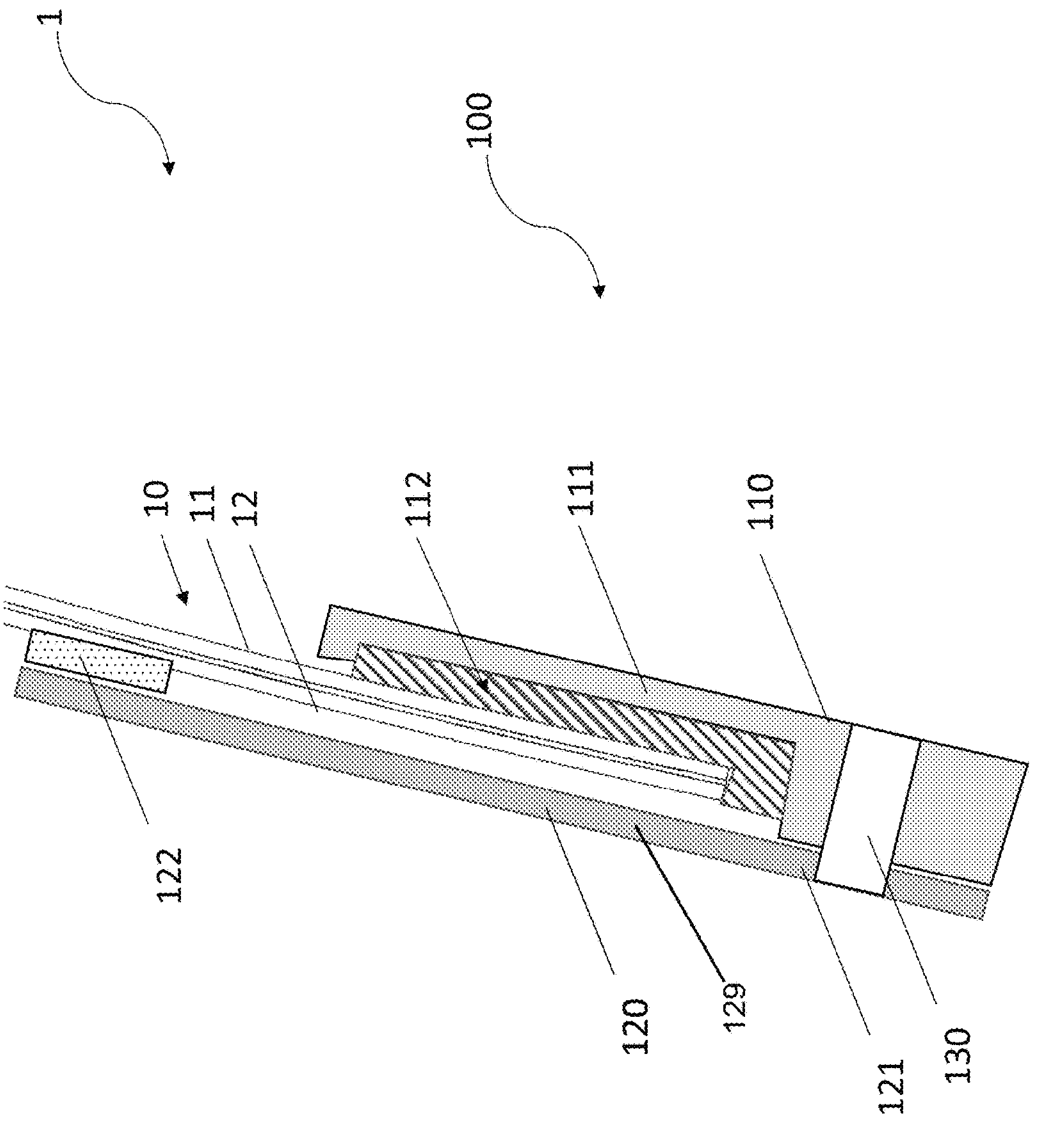
FIG. 1 is a schematic section of a vehicle window according to an exemplifying embodiment of the present invention.

With reference to FIG. 1, a first embodiment of the present invention is described.

Side windows are usually placed substantially vertically to cover an opening in the closed position. For mobile window, the lower part of the window is hidden in the car body where a lifting system is also hidden.

In some embodiments, the vehicle window is not framed causing higher deformation under pressure because the window is not guided or supported.

In a door with a movable window, in lower area, the lifting system is connected to the window via a rigid holder which is guiding the panel. In case of frameless doors, the holder is used to fix the panel to the lifting system and also to guide the orientation of the panel.

The current invention enable to fix the holder to the panel independently of the panel tolerance and enable to get the right orientation of the panel. The holder improves also the rigidity of the assembly.

FIG. 1 shows a section focused-on-the-holder of a vehicle window 1 comprising a panel 10 having a first surface 11 and a second surface 12. The vehicle window further comprises at least a window holder 100 for firmly retaining the panel to a lifting system (not shown). When the window is placed in a vehicle, the first surface is preferably the surface facing the interior of the vehicle.

The window holder comprises an inner member 110 and an outer member 120. The window holder has a generic U-Shaped profile where the inner member represents one of the branches and the outer members represent the second branch. The panel is placed between branches of the U-shaped profile.

The inner member 110 has a bonding part 111 bonded to the first surface of the panel.

According to some embodiments, the inner member has a plastic based composition to minimize the weight of the holder and to facilitate the process of manufacturing the holder. Preferably, the inner member can made with a thermoplastic material. The inner member can be made with a fiber mat composite to ensure the resistance. In some cases, to have a good compatibility with other members of the holder, even if the price is higher than the plastic based material, the inner member can be made with a casting of aluminium and magnesium material.

According to the invention, to fix the holder to the panel independently of the panel tolerance and enable to get the right orientation of the panel, preferably the bonding material has a shore value comprises between 65 and 95 ShoreA (65≤shore value 95) and more preferably between 65 and 85 ShoreA (65≤shore value 85).

According to the invention, the thickness of the bonding material between the inner member and the surface of the panel is comprised between 2 mm and 4 mm.

According to the invention, to minimize constraints on the panel while keeping the required and defined angle between the holder and the glazing, the young modulus of the bonding material equals to or is lower than 140 MPa. Preferably, to respect the required and defined angle between the holder and the glazing, the Young's modulus of the bonding material is comprised between 20 MPa and 100 MPa, and more preferably, between 30 MPa and 50 MPa. When the Young's modulus is too low (<15 MPa), additional forces can occurs on the panel. When the Young's modulus is too high (>140 MPa), additional constraints can occur on the panel In some embodiments, the bonding material is an adhesive tape, a thermoplastic-based material, such as TPE, or a glue.

In some preferred embodiments, the bonding material is a PU-based glue, such as 2K-PU, PU-R allowing to reduce these additional constraints and forces on the panel while allowing, when the window holder is in use, to firmly fix the holder on the panel while guaranteeing the required angle between the holder and the glazing and minimizing forces and constraints on the panel.

The bonding material, especially the PU-based glue, can be injected between the inner member and the first surface of the panel and then cured.

In some preferred embodiments, the PU-based glue is poured into a chamber create by the inner member and the surface of the panel. PU-based glue is poured with dispensing system which enable the mixing of two components, the Polyol and the Isocyanate, in a define ratio. The stirring equipment works in a speed range comprise between 500 till 2000 RPM and at a temperature comprise substantially between 10° C. till 20° C. The stirring equipment is able to bring energy to the material which enable the reaction of the two components. The surface of the panel could be preheated to a temperature comprise substantially between 40 till 80° C. in order to accelerate the curing reaction of the material.

In some preferred embodiments, the bonding material is a PU-based glue with a shore value about 90 shoreA and a young modulus of about 40 MPa.

Preferably, to ensure the fixation and the orientation of the holder to the panel, the bonding material allows to have an assembly able to withstand a tangential force of at least 650 N and preferably higher than or equals to 680 N.

In some embodiments, depending on the composition of the surface of the panel, the bonding material is a PU-based glue (2K-PU, PU-R)TPE, adhesive tape or another glue. The glue, especially the PU-based glue, can be injected between the inner member and the first surface of the panel and then cured. PU-based glue could be also poured into a chamber create by the inner member and the surface of the panel. A mix of material can be used: an adhesive tape to ensure to position of the holder to the first surface and a PU-based glue to ensure the fixation.

The outer member 120 having a fixing part 121 to be fixed to the lifting system. The outer member is assembled to the inner member via the assembling means to clutch the panel. The outer member is then in contact with the second surface of the panel.

To spread compression forces on a larger panel surface and to avoid breakage, the outer member comprises a base element and an external element fixed to the base element. The base element is less rigid than the external element.

In some embodiments, the base element has a plastic based composition to minimize the weight of the holder and to facilitate the process of manufacturing the holder. Preferably, the base element can made with a thermoplastic material. The base element can be made with a fiber mat composite to ensure the resistance. Preferably, the external element has a metal based composition. To minimize the weight of the holder, the external element can have a plastic based composition. The plastic based composition can be reinforced with fibers to form a composite. To clutch the window, the outer member is a rigid member made from a material characterized by a Young modulus higher than 60 GPa. To ensure the stiffness of the holder, the external element can comprise stiffening means. These stiffening means can be made with an local over-thickness or with a specific 3D shape.

According to the invention, the outer member can comprise a compression pad 122 to be in contact with the second surface of the vehicle window to avoid breakage.

The holder in his lower part can comprises a threatened hole 130 to fix it to the lifting system. This allows to avoid to fix the lifting system through the panel itself or the drill a hole in the panel while maximizing the surface area of contact between the holder and the panel.

In some embodiments, the base element and the external element can be made in a single element or in a single process.

A vehicle window can comprise more than one holder to increase the stiffness of the system or to depend on characteristics, such as the shape, the weight, . . . of the panel. In a same window, it is possible to install different types of holder. For example, a smaller holder can placed at the front of the bottom of the window to avoid any rotation and an holder according to the invention is used at the back of the window to allow the window to move.

The panel can be a flat or curved panel to fit with the design of the car.

In one embodiment, the panel comprises at least a glass sheet. The glass sheet can be processed, i.e. annealed, tempered, . . . to respect with the specifications of security and anti-thief requirements. A heatable system, for example a coating or a network of wires, can be applied on the panel to add a defrosting and/or a demisting function for example.

In another embodiment, the panel can comprise at least two glass sheets alternatively separated by at least one interlayer. The interlayer can be a gas, vacuum using spacers to avoid direct contact between the two glass sheets, . . . .

In some embodiments, the panel can be a laminated glass sheet to reduce the noise and/or to give a panel safer. In these embodiments, the interlayer is a thermoplastic interlayer. The laminated glazing comprises glass sheets maintained by one or more interlayers positioned between glass sheets. The interlayers employed are typically polyvinyl butyral (PVB) or ethylene-vinyl acetate (EVA) for which the stiffness can be tuned. These interlayers keep the glass sheets bonded together even when broken in such a way that they prevent the glass from breaking up into large sharp pieces. In the case of a laminated glass sheet, it could be advantageous to have varying thicknesses of glass sheets to reduce weight and noise. Due to of induced deformations on the panel, thin glass sheets with a thickness less than 1 mm can be used without be bent or deformed. Thus, such thin glass sheet can keep the desired design.

Laminated panel and specially thin laminated panel are more flexible and more sensitive to deformation than monolithic panel. Surprisingly, the invention allows to give the right geometry even with more tolerances and flexible panel.

The glass sheet can be a clear glass or a coloured glass, tinted with a specific composition of the glass or by applying a coating or a plastic layer for example.

FIG. 1 shows a panel 10 comprising two glass sheets laminated together by a thermoplastic interlayer.

Figure 2:
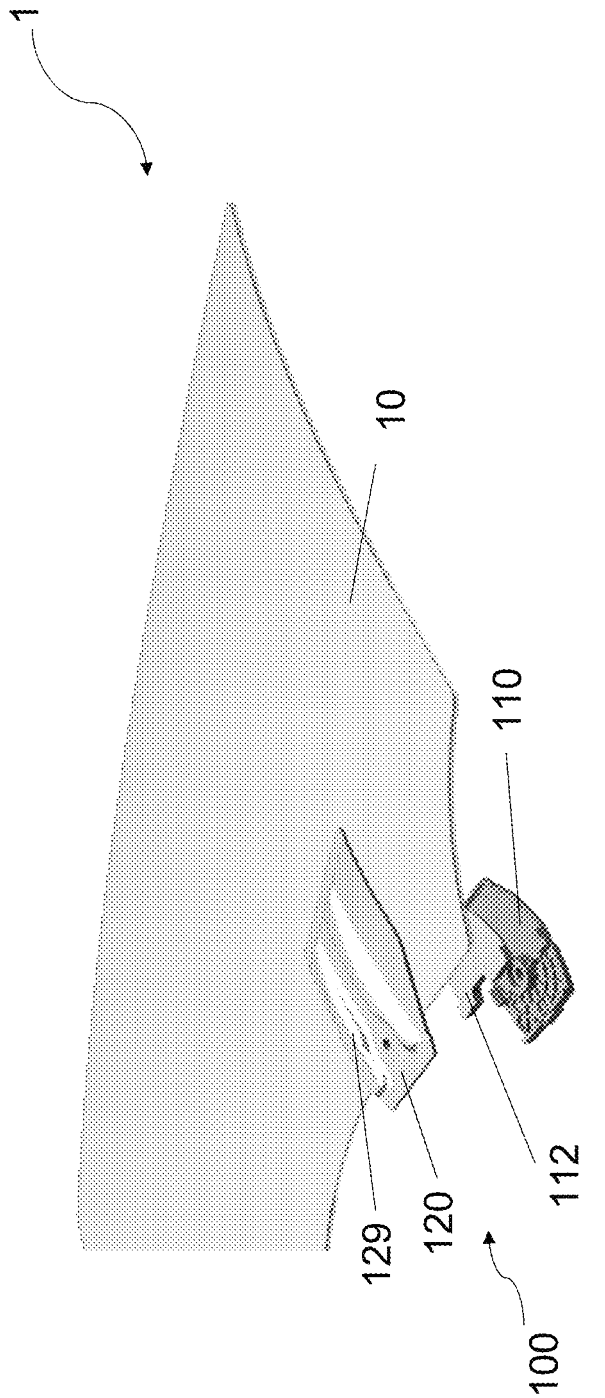
FIG. 2 is a schematic exploded view of a window holder in front of a panel.

FIG. 2 shows a exploded view of the different members of an holder according to the invention.

An inner member 110 of an holder 100 is bonded with a bonding material 112 to a first surface 11 of a laminated glass panel 10. Then an outer member 120 is assembled to the bonded inner member to clutch the panel. The outer member comprises stiffening means 129.

Figure 3:
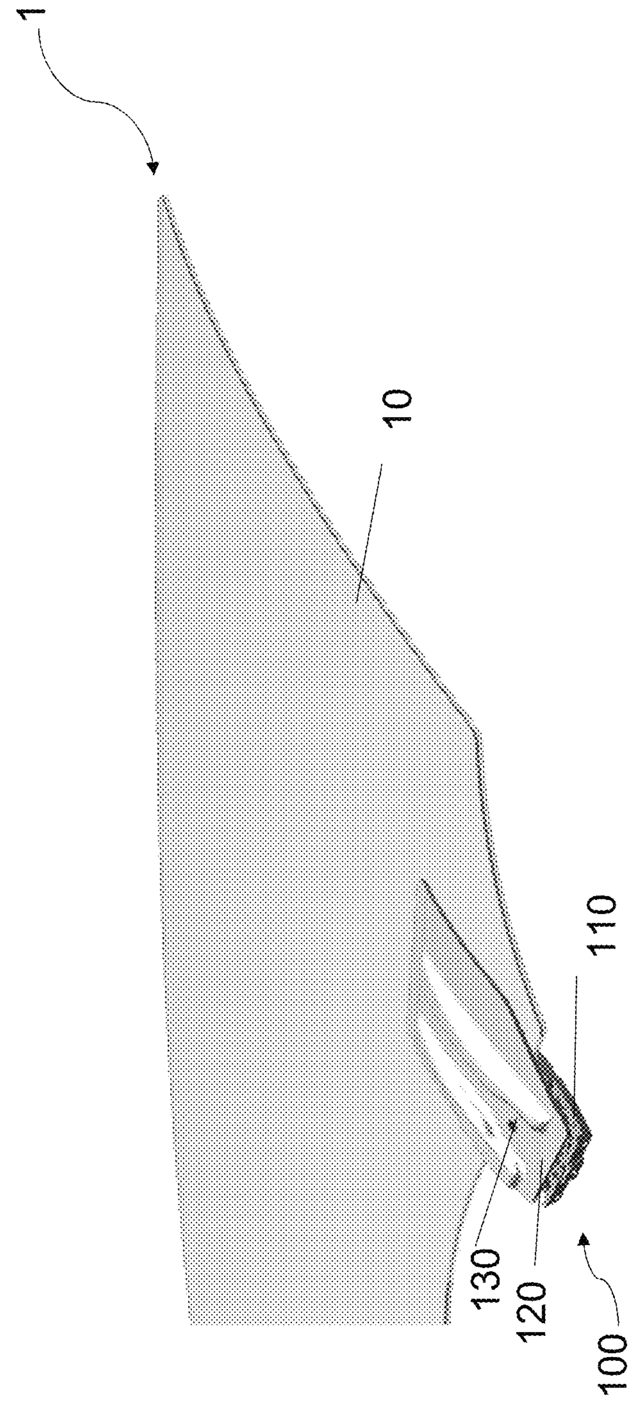
FIG. 3 is a schematic view of vehicle window according to an exemplifying embodiment of the present invention.

FIG. 3 shows a panel 10 clutched with an holder 100. A hole through the holder allows to fix it to a lifting system.

According to some embodiments of the invention, an inner member 110 is bonded with a PU based material where the PU-based material is poured at low pressure, meaning less than 1 bar, via a dispensing unit in a chamber created by the inner member, the panel and by a top pad which is closing this chamber. The said top pad is made of a rigid component, that cannot be deformed during the process, and a soft material in a range from 25 to 60 shoreA. The PU based material is poured through the top pad on one side which enable to vent the air from the chamber through an aperture in the other side of the top pad.

PU is made of Isocyanate and Polyol-component mixed into a defined weight ratio. The preferred ratio is around 1 for 2. Other ratio can be used, for example 58 g of Isocyanate for 100 g of Polyol-component. Material is poured with a flow rate range from 1 to 3 g/s. Fast curing PU-based material can be used. Fast curing PU-based material are reacting at ambient temperature and are curing in range from 6 to 30 s.

The present invention permits to set at the defined angle the holder on the panel without taking into account tolerances of the 3D shape of the panel while guaranteeing, during the use of the vehicle window, a minimal degree of tolerances of the position of the vehicle window in front of the opening of the vehicle avoiding noice for users due to wind, ensuring tightness, when the vehicle window is in a closed position, around the vehicle window even without guide and guaranteeing the pre-bending of the vehicle window. This means that no specific setting, in the vehicle assembly line, is compulsory to have the vehicle window in the required position to have the tightness, the flatness with the car body, permitting to minimize the assembly time and save cost.

The invention claimed is:

1. A window holder for retaining a vehicle window to a lifting system, the window holder comprising:

an inner member comprising:

a bonding part bonded to a bottom edge of a first surface of the vehicle window using a bonding material; and an outer member in contact with a second surface of the vehicle window and comprising:

a fixing part fixed to the lifting system, stiffening means, and a compression pad in contact with the second surface of the vehicle window;

wherein the outer member is assembled to the inner member via a hole, the hole not passing through the vehicle window, wherein the window holder presents a U-shaped profile with the inner member representing a first branch of the U-shaped profile and the outer member representing a second branch of the U-shaped profile, the vehicle window being placed between the first and second branches of the U-shaped profile, and wherein the inner member is bonded to the vehicle window and the outer member is not bonded to the vehicle window.

2. A vehicle window comprising:

the window holder according to claim 1; and a panel having the first surface and the second surface;

wherein the bonding part of the inner member is bonded with the bonding material to the first surface of the vehicle window and the outer member is assembled to the inner member.

3. The vehicle window according to claim 2, wherein the bonding material has a shore value between 65 and 95 (65≤shore A value≤95).

4. The vehicle window according to claim 2, wherein the bonding material is a glue.

5. The vehicle window according to claim 4, wherein the glue is a PU-based glue.

6. The vehicle window according to claim 2, wherein the panel comprises a glass sheet.

7. The vehicle window according to claim 2, wherein the panel comprises at least two glass sheets alternatively separated by at least one interlayer.

8. The vehicle window according to claim 7, wherein the at least one interlayer is a thermoplastic interlayer.

9. The vehicle window according to claim 2, wherein the vehicle window is free of a hole.

10. A method to assemble the window holder according to claim 1 to the vehicle window having the first surface and the second surface comprising:

bonding a first part of the inner member to the first surface of the vehicle window, and assembling the outer member to a second part of the inner member to be in contact with the second surface.

11. A method to assemble the window holder according to claim 1 to the vehicle window having the first surface and the second surface comprising:

bonding a first part of the inner member to the first surface of the vehicle window with a fast-curing PU-based glue reacting at ambient temperature and curing in the range of 6 to 30 seconds;

assembling the outer member to a second part of the inner member to be in contact with the second surface.

* * * * *